United States Patent
Kim

(10) Patent No.: US 6,304,568 B1
(45) Date of Patent: Oct. 16, 2001

(54) INTERCONNECTION NETWORK EXTENDABLE BANDWIDTH AND METHOD OF TRANSFERRING DATA THEREIN

(75) Inventor: Kab-young Kim, Seoul (KP)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/013,190

(22) Filed: Jan. 26, 1998

(30) Foreign Application Priority Data

Jan. 27, 1997 (KP) .................................................. 97-2281

(51) Int. Cl.[7] .................................................. H04Q 11/00
(52) U.S. Cl. .................................................. 370/387
(58) Field of Search .................................. 370/387, 388; 340/825.79, 825.8, 2.1, 2.6, 2.7; 709/238

(56) References Cited

U.S. PATENT DOCUMENTS

| | | |
|---|---|---|
| 4,706,150 | 11/1987 | Lebizay et al. . |
| 4,929,939 | 5/1990 | Varma et al. . |
| 4,984,237 | * 1/1991 | Franaszek .......................... 370/388 |
| 5,345,228 | * 9/1994 | Franaszek ....................... 340/825.79 |
| 5,377,333 | 12/1994 | Nakagoshi et al. . |
| 5,396,231 | 3/1995 | Hein . |
| 5,430,442 | 7/1995 | Kaiser et al. . |
| 5,444,700 | 8/1995 | Martikainen et al. . |
| 5,598,408 | 1/1997 | Nickolls et al. . |
| 5,603,044 | 2/1997 | Annapareddy et al. . |
| 5,617,539 | 4/1997 | Ludwig et al. . |
| 5,659,784 | 8/1997 | Inaba et al. . |
| 5,680,634 | 10/1997 | Estes . |
| 5,682,479 | 10/1997 | Newhall et al. . |
| 5,689,722 | 11/1997 | Swarztrauber . |
| 5,701,416 | 12/1997 | Thorson et al. . |

FOREIGN PATENT DOCUMENTS

| | | |
|---|---|---|
| 4-348451 | 12/1992 | (JP) . |
| 6-274459 | 9/1994 | (JP) . |
| 7-200508 | 8/1995 | (JP) . |
| 8-88872 | 4/1996 | (JP) . |
| 8-297651 | 11/1996 | (JP) . |
| 9-34852 | 2/1997 | (JP) . |

* cited by examiner

Primary Examiner—Edwin C. Holloway, III
(74) Attorney, Agent, or Firm—Robert E. Bushnell, Esq.

(57) ABSTRACT

An interconnection network in which a control plane and data planes are separate and the bandwidth is extendable, and a method for transferring data includes a control plane including control routers connected to the processors, for exchanging control information and generating information on setting a path for a message transmitted between the processors, and a control line for connecting the control routers together in a predetermined topology, and one or more data planes each including data routers each connected to the processors, for transmitting and receiving messages using the path information on messages generated by the control router, and a data transfer line for connecting the data routers together in the same topology as that of the control plane. It is possible to arbitrarily extend the bandwidth of only the data plane, since the control plane and the data plane are separate, and to construct a high speed interconnection network since the latency time consumed when the path is traversed is independent of the size and frequency of the data transferred across the interconnection network. Therefore, it is possible to construct a flexible multicomputer system, by taking advantage of the large bandwidth and short latency time.

7 Claims, 7 Drawing Sheets

FIG. 1
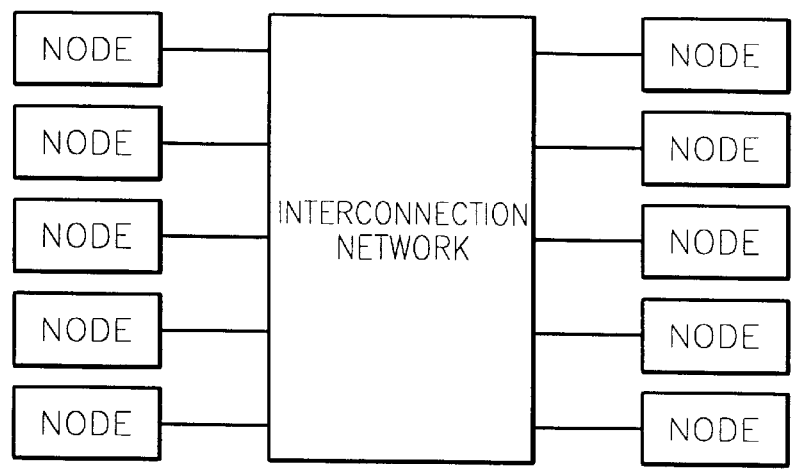
FIG. 2
FIG. 2A
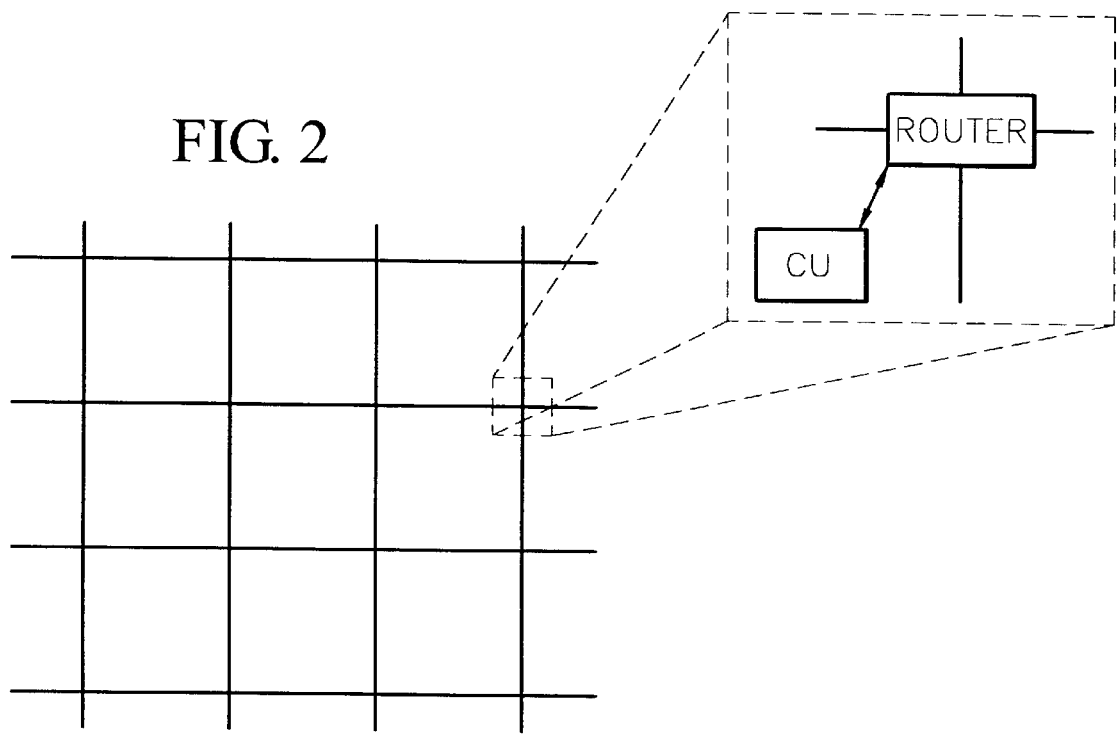

<TWO INDEPENDENT CONNECTION NETWORKS>   <NETWORK HAVING DOUBLED BANDWIDTH>

INTERCONNECTION NETWORK EXTENDABLE BANDWIDTH AND METHOD OF TRANSFERRING DATA THEREIN

CLAIM OF PRIORITY

This application makes reference to, incorporates the same herein, and claims all benefits accruing under 35 U.S.C. §119 from an application entitled Interconnection Network Extendable Bandwidth And Method of Transferring Data Therein earlier filed in the Korean Industrial Property Office on Jan. 27, 1997, and there duly assigned Serial No. 97-2281 by that Office.

BACKGROUND OF THE INVENTION

Field of the Invention

The present invention relates to an interconnection network in a multicomputer system, and more particularly, to an interconnection network in which a control plane and a data plane are included and the bandwidth of the data plane is extendable and a method of transferring data in the interconnection network.

DESCRIPTION OF RELATED ART

The performance of a Von Nuemann computer is limited, due to structural problems and physical restrictions. Various computers are interconnected to allow parallel processing in order to overcome such restrictions. Namely, a plurality of single processors or a plurality of symmetric multiprocessors (SMP) are connected to process in parallel and to realize a high performance computer system. A system using this multicomputer parallel processing method includes a predetermined number of nodes and an interconnection network for a message transfer between the nodes.

In this case, the overall performance of the system is dependent on the performance of each node and the performance of the interconnection network which connects the nodes. The performance of the interconnection network is quantified by the bandwidth between the nodes and a latency time. Therefore, in order to transmit a great amount of data from a source node to a destination node in a short time, the interconnection network must provide a large bandwidth and a short latency time. In particular, new fields such as decision support systems (DSS) and multimedia systems require high amounts of data to be transferred between nodes. These applications create a need for improving the performance of interconnection networks.

In an interconnection network and nodes in a multicomputer system, the interconnection network provides a path through which the nodes can communicate with each other. They can have various structures such as a ring, a Banyan, a tree, a hypercube, a mesh, and a torus. The above-mentioned structures each have advantages and disadvantages. Common characteristics of earlier interconnection networks will be described with reference to the mesh structure.

In a network having a two-dimensional mesh structure, each crossing point denotes a node. The node includes a computing unit (CU) and a router. The router is connected to other adjacent nodes and forms part of the interconnection network when the interconnection network and the CU are considered as dependent elements.

A path must first be set when a message is to be transferred between nodes. An appropriate method selected from among a circuit switching method, a packet switching method, a wormhole routing method, and virtual cut-through method can be used for setting the path. In general, the path setting method is determined when the router is designed. Various matters such as the end use of the system, the size of messages, and a transfer frequency must be fully considered before the method for setting the path is selected, since setting the path is important in determining the latency time of the interconnection network.

In general, a router needs to exchange information of a special purpose with other adjacent routers, for setting paths, managing the interconnection network, and detecting network errors. In an earlier interconnection network, such information shares the same link of the interconnection network with the general data. However, the link of the interconnection network can not be effectively constructed in such a situation. Namely, in the earlier interconnection network, when large amounts of data must often be transferred, a control signal for setting the path or managing the interconnection network shares the link of the network with data to be transferred, thus inevitably causing interference between them. Accordingly, the effective bandwidth and the latency time deteriorate. Also, the design of the router becomes complicated and the time required for determining the path becomes longer, since the control signal and the transfer data must be simultaneously processed.

Furthermore, the bandwidth of the link between routers is determined when the router is designed in the interconnection network in the earlier interconnection network such as BYNET of NCR, the SERVERNET of Tandem, and the HPS of IBM. Therefore, in case the bandwidth and latency time of the interconnection network must be improved in order to be used for a next generation application, earlier interconnection networks do not provide a convenient mechanism for making the improvement.

In general, in order to increase the bandwidth, high speed semiconductor technology must used or the number of pins of a semiconductor chip must be increased. However, such methods are costly, and, in many cases, the uppermost limit of semiconductor integration technology has already been reached. A method of overlapping multiple interconnection networks in parallel is an alternative for increasing the effective overall bandwidth. It is possible to increase the throughput of standard data simultaneously transferable through the interconnection network by this method. However, this fails to gain various advantages which can be obtained by increasing the bandwidth of the link in the router. Namely, in the case of using two overlapped interconnection networks, it is possible to simultaneously transfer two messages, however, it is impossible to reduce the time required for transferring a message.

In the case of overlapping the interconnection networks according to earlier technology as compared was a case of increasing the bandwidth at the link, assume the size of a message to be sent is M and bandwidth of the earlier interconnection network is W. The message transmission time becomes M/W since either one network or another network is selected in the case of two independent interconnection networks. In the case of doubling the bandwidth, it is possible to reduce the message transmission time to M/2W. Therefore, an important reason to overlap interconnection networks is actually to provide error tolerance through redundancy rather than to extend the bandwidth. Also, the router must be newly designed in order to extend the bandwidth since the earlier interconnection network can not generally provide the effect of doubling the bandwidth.

In the earlier interconnection network, when the header of the message is blocked by other messages, the latency time becomes longer due to the processes for setting the path since other nodes can not set paths until the source and destination nodes release the blocking path.

The following patents each disclose features in common with the present invention:

U.S. Pat. No. 4,706,150 to Lebizay et al., entitled *a Switching Protocal for Multiple Autonomous Switching Planes*, U.S. Pat. No. 5,430,442 to Kaiser et al., entitled *a Cross Point Switch with Distributed Control*, U.S. Pat. No. 5,444,700 to Martikainen et al., entitled *a Switching Element and Method for Controlling the Same*, U.S. Pat. No. 5,377,333 to Nakagoshi et al., entitled *a Parallel Processor System Having Computing Clusters and Auxiliary Clusters Connected with Network of Partial Networks and Exchanges*, U.S. Pat. No. 5,396,231 to Hein, entitled *a Modular Communications Interconnection*, U.S. Pat. No. 5,617,539 to Ludwig et al., entitled *a Multimedia Collaboration System with Separate Data Network and A/V Network Controlled by Information Transmitting on the Data Network*, U.S. Pat. No. 5,659,784 to Inaba et al., entitled *a Multi-processor System Having Communication Register Modules Using Test-and-Set Request Operation for Synchronizing Communications*, U.S. Pat. No. 5,603,044 to Annapareddy et al., entitled *an Interconnection Network for a Multi-nodal Data Processing System Which Exhibits Incremental Scalability*, U.S. Pat. No. 5,689,722 to Swarztrauber, entitled *a Multipipeline Multiprocessor System*, U.S. Pat. No. 5,682,479 to Newhall et al., entitled *a System and Method for Network Exploration and Access*, U.S. Pat. No. 5,598,408 to Nickolls et al., entitled *a Scalable Processor to Processor and Processor to I/O Interconnection Network and Method for Parallel Processing Arrays*, U.S. Pat. No. 4,929,939 to Varma et al., entitled *a High-speed Switching System with Flexible Protocol Capability*, U.S. Pat. No. 5,701,416 to Thorson et al., entitled *an Adaptive Routing Mechanism for Torus Interconnection Network*, and U.S. Pat. No. 5,680,634 to Estes, entitled *a Fixed Interconnection Network Method and Apparatus for a Modular Mixed-resolution, N-dimensional Configuration Control Mechanism*.

SUMMARY OF THE INVENTION

It is an object of the present invention to provide an interconnection network in a multicomputer system, in which the bandwidth in the interconnection network is extendable and the same latency time is required regardless of the size and frequency of data, where a path is set by additionally including a control plane and a data plane in an interconnection network and the bandwidth of the data network is extendable.

It is another object of the present invention to provide a method for transferring data in the above noted interconnection network.

To achieve the first object, there is provided an interconnection network whose bandwidth is extendable, for transmitting and receiving messages between a predetermined number of processors constituting a multicomputer system, comprising a control plane comprising control routers connected to the processors, for exchanging control information and generating information on setting a path for a message transmitted between the processors, and a control line for connecting the control routers together in a predetermined topology, and one or more data planes each comprising data routers each connected to the processors, for transmitting and receiving messages using the path information on messages generated by the control router, and a data transfer line for connecting the data routers together in the same topology as that of the control plane.

To achieve the second object, there is provided a method of transferring data in an interconnection network comprising a control plane and one or more data planes having the same topology as that of the control plane, comprising the steps of transferring header information having the address of a destination node, from a source node to the destination node along a path of intermediate nodes according to the topology, and establishing a path for transmitting a message across the control plane, transferring information on the path across the control plane to the data planes, and establishing a path for transmitting a message across the data planes, releasing the established path across the control plane in order to transmit another message, and transmitting data to the destination node along the established path across the data planes.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 shows the structure of an interconnection network and a node, in a multicomputer system;

FIG. 2 and FIG. 2A together show a mesh plane structure according to earlier technology.

DESCRIPTION OF THE PREFERRED EMBODIMENTS

Hereinafter, the present invention will be described in detail with reference to the attached drawings.

In the present invention, data transmitted between nodes and control signals required by the interconnection network in order to transmit the data are each carried by a physically separate network. The network by which the control signals are transmitted is called a control plane, and the network by which data is transferred is called a data plane.

FIG. 1 shows the general structure of the interconnection network and node in a multicomputer system as noted above in the Description of the Related Art while FIG. 2 and FIG. 2A together show a network having 2-dimensional structure, each crossing point denoting a node, as also noted above in the Description of the Related Art.

Figure 3:
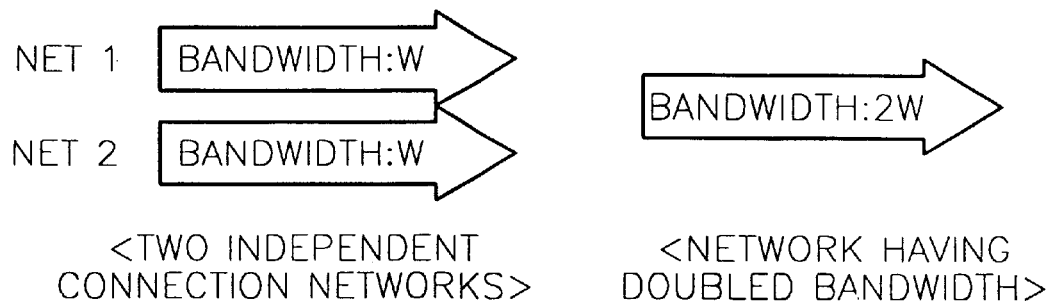
FIG. 3 compares the case of overlapping interconnection networks according to earlier technology with the case of increasing the bandwidth of a link.

In FIG. 3, the case of overlapping the interconnection networks according to earlier technology is compared with the case of increasing the bandwidth of a link. Assume the size of a message to be sent is M and the bandwidth of the earlier interconnection network is W. Message transmission time becomes M/W since either the net 1 or the net 2 is selected in the case of two independent interconnection networks. Meanwhile, in the case of doubling the bandwidth, it is possible to reduce the message transmission time to M/2W. Therefore, an important reason to overlap interconnection networks is actually to provide error tolerance through redundancy rather than to extend the bandwidth. Also, the router must be newly designed in order to extend the bandwidth, since the earlier interconnection network cannot generally provide the effect of doubling the bandwidth.

Figure 4A:
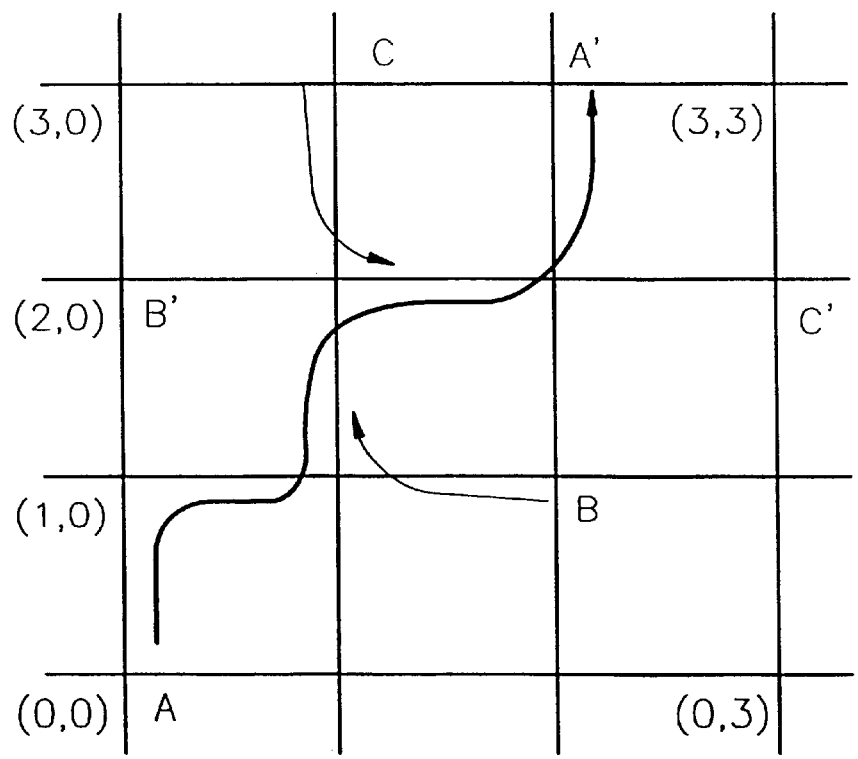
FIG. 4A through 4C show message transferral processes in a mesh plane according to earlier technology.
Figure 4B:
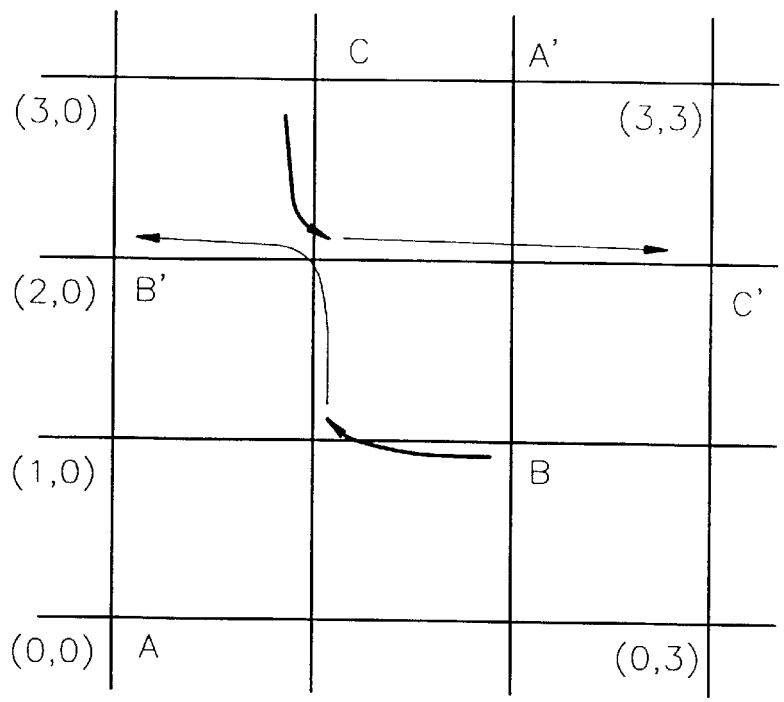
Figure 4C:
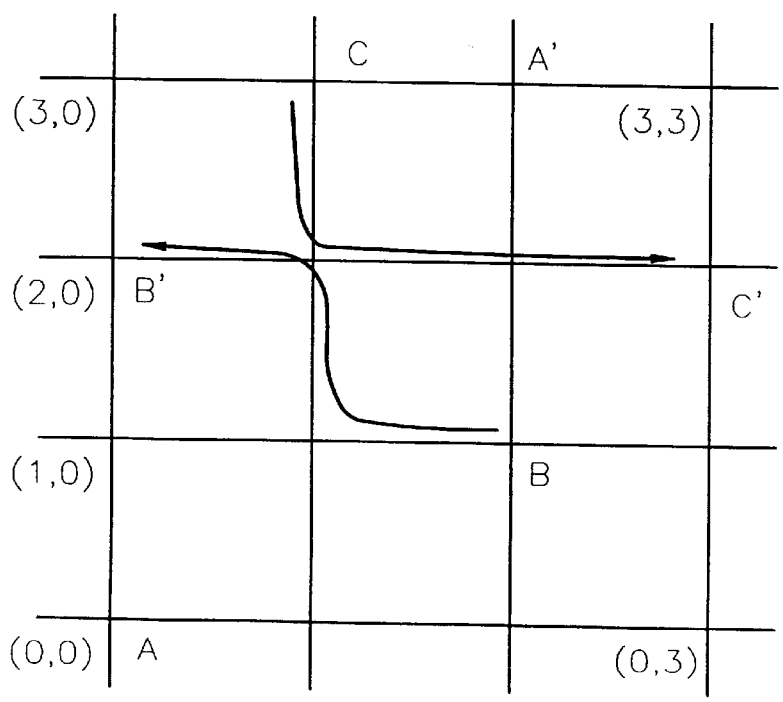

Hereinafter, structural problems common to earlier interconnection networks will be described with reference to the attached drawings. The interconnection network is assumed to have a mesh structure. FIGS. 4A through 4C show message transferral processes in a mesh plane according to earlier technology. In FIGS. 4A through 4C, A, B, and C denote source nodes and A', B', and C' denote corresponding destination nodes. Any method among the circuit switching method, the packet switching method, and the wornhole routing method can be used. First, in FIG. 4A, the path of a message has been set from A to A' and data is being transferred. B and C are in the process of setting the path. At this time, since A already uses part of the path desired to be used by B and C, the header of the message transferred by B and the header of the message transferred by C must stand by in the (1,1) node and the (2,1) node, respectively, until A completes the transfer of the message and releases the path which is used. When A completes the transfer of the message, the message header of B which stood by in the (1,1) node and the message header of C which stood by in the (2,1) node can proceed to set the paths to the respective destination nodes. FIG. 4B shows such processes. As shown in FIG. 4C, B and C completed setting the paths and can transfer messages to the respective destination nodes along the set paths. Therefore, when the header of a message is blocked by other messages, in the earlier interconnection network, the latency time becomes longer due to the processes for setting the path since other nodes cannot set paths until the source and destination nodes release the blocking path.

Figure 5:
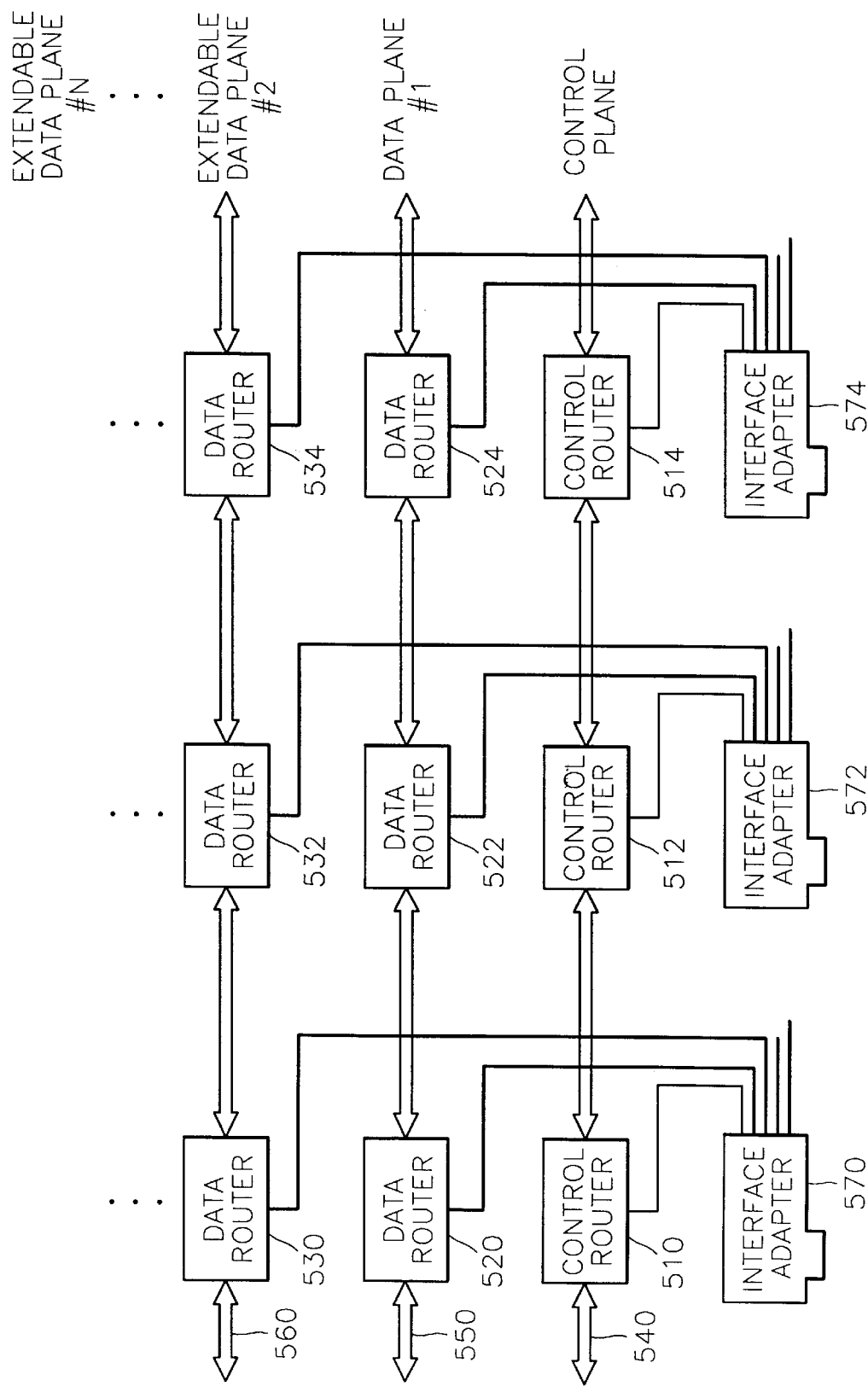
FIG. 5 shows an interconnection network having a one-dimensional structure according to the present invention.

As shown in FIG. 5, an interconnection network according to the present invention is separated into the control plane and the data plane. The control plane is connected to the processors which constitute the nodes through interface adapters 570, 572 and 574, and includes control routers 510, 512 and 514 one per node for exchanging control information for setting the path of messages, managing the interconnection network, and detecting errors. The control plane also includes a control line 540 for connecting the control routers by a predetermined topology. The data plane is connected to the processors which constitute the nodes through the interface adapters 570, 572 and 574, and includes data routers 520, 522 and 524 one per node for setting the path of messages transferred between the processors. The data plane also includes a data transfer line 550 for connecting the data routers 520, 522 and 524 by the same topology as that of the control plane.

The data plane is extendable to a predetermined number of planes which is more than one. FIG. 5 shows an extendable data plane #2 (including data routers 530, 532 and 534 and a data transfer line 560) and shows that the number of data planes is extendable within a limit imposed by the interface adapters 570, 572, and 574.

Figure 6:
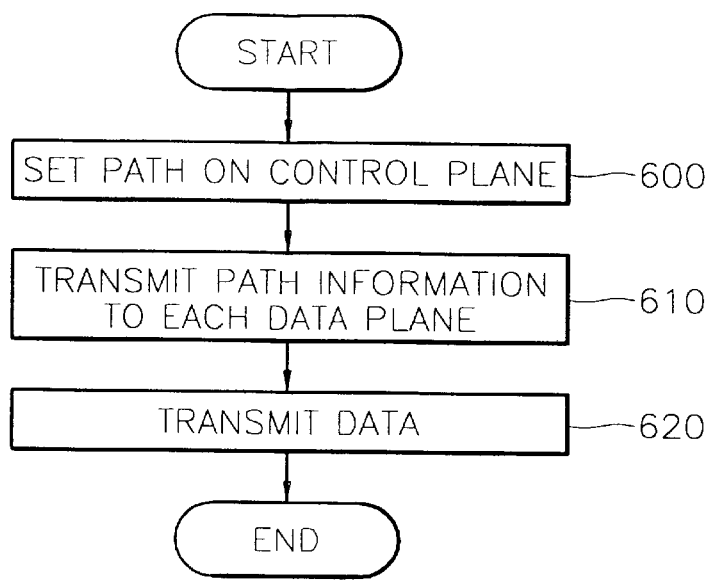
FIG. 6 is a flowchart showing a data transferral method according to the present invention.

FIG. 6 is a flowchart showing a method for transferring data according to the present invention. According to the present invention, the path from the source node to the destination node is determined on the control plane (step 600). Namely, the header sent from the source node includes the address of the destination node. The node which receives the header determines its path based on the destination node address. When the path has been determined on the control plane, each control plane router on the path gives path information to the corresponding router on the data plane (step 610). In this way, a path through which data can be transferred from the source node to the destination node is constructed on the data plane. When the processes of setting the path are completed, the header is transferred toward the destination node on the control plane and data horizontally moves along the header on the data planes (the first data plane, the second data plane, . . . ). Therefore, the present invention is called a Tornado routing method (step 620).

The present invention can be applied to various topologies such as a ring, a Banyan, a tree, a hypercube, a mesh, and a torus. However, in an embodiment of the present invention, an application to a two dimensional mesh plane structure will be described.

Figure 7:
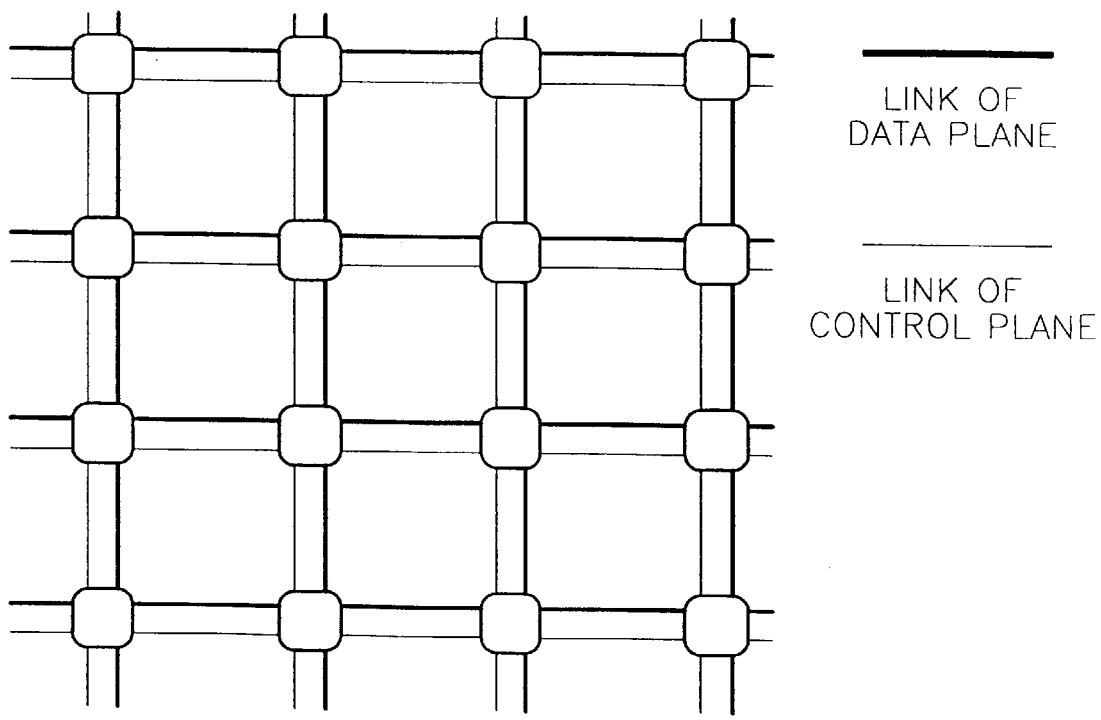
FIG. 7 shows a two-dimensional mesh plane structure as an embodiment of the present invention.
Figure 9:
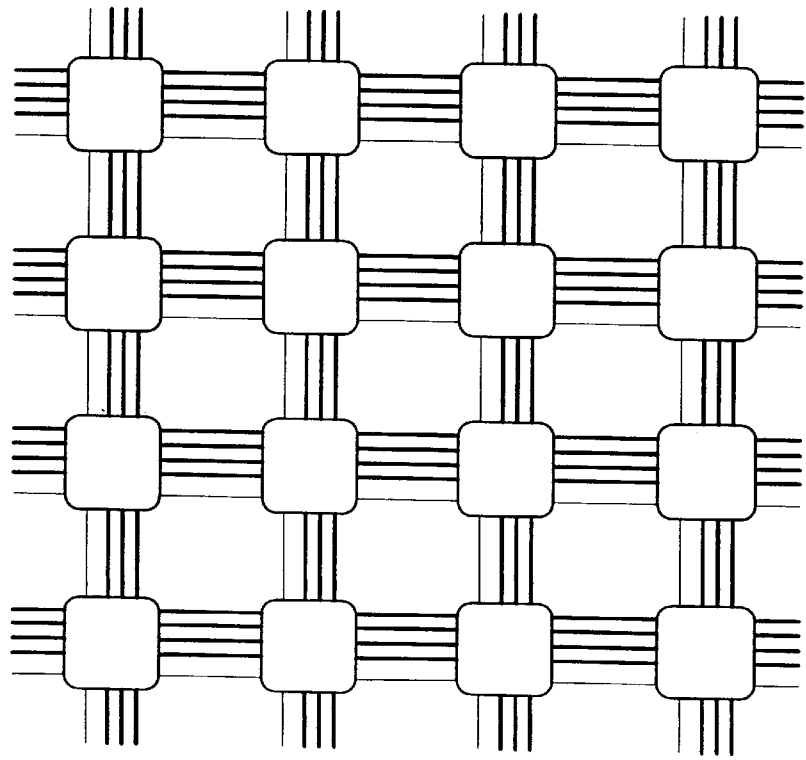
FIG. 9 shows a structure in which the bandwidth of a data plane is tripled in the interconnection network according to the present invention.

FIG. 7 shows the two dimensional mesh plane structure according to the present invention. In the two dimensional mesh plane structure shown in FIG. 7, thin lines denote the control plane and thick lines denote the data plane. In FIG. 7, the data plane uses only one plane. However, the physically separate data plane is extendable as shown in FIG. 9. In the present invention, the control plane and the data plane use different routers. They are respectively called control routers and data routers.

Figure 8A:
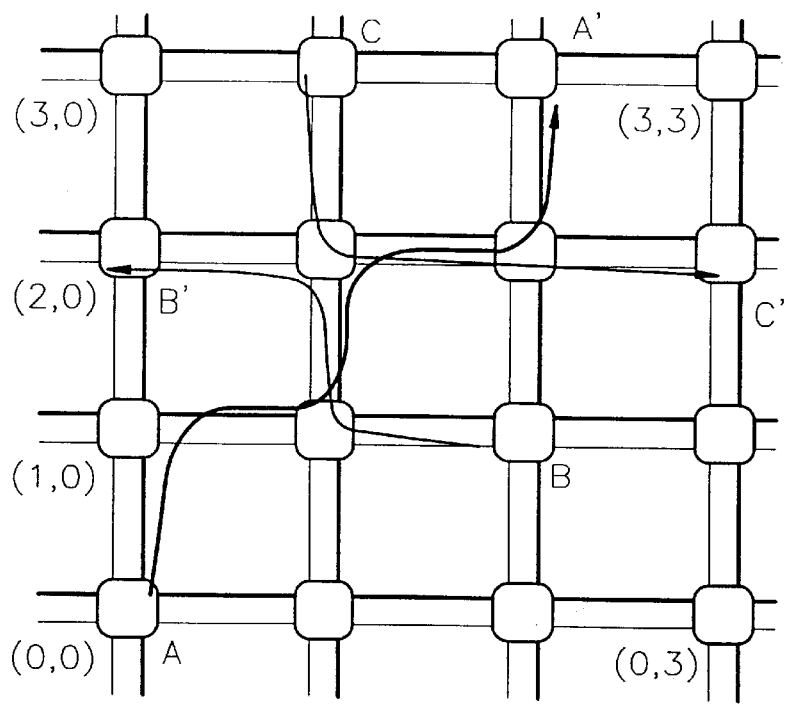
FIG. 8A through 8C show message transferral processes in the mesh plane according to the present invention.
Figure 8B:
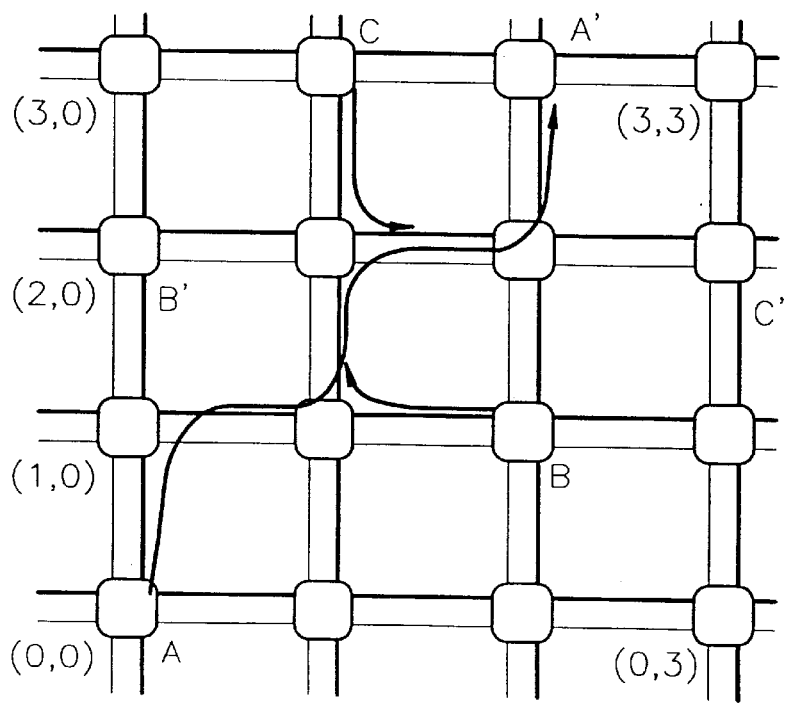
Figure 8C:
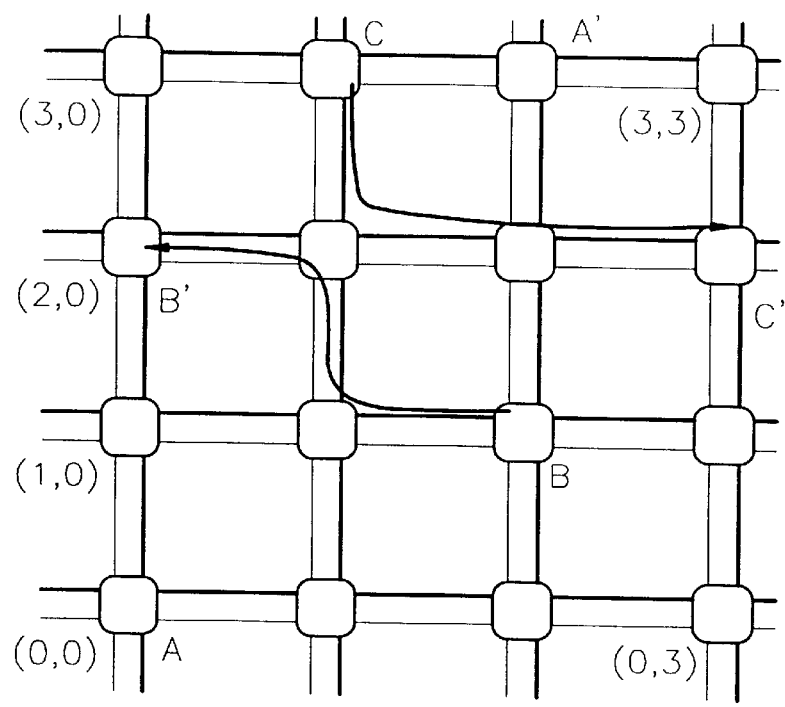

FIGS. 8A through 8C show processes of transferring a message in the mesh plane according to the present invention. In FIG. 8A, the message from A is already being transferred along a set path, and the messages from B and C must use nodes on the path occupied by the message of A. In the present invention, since the data plane is separated from the control plane and the path is set in the control plane, the messages of B and C can proceed to set paths regardless of the path of message A on the data plane. As soon as the control routers set the path on the control plane, the path information is transferred to the data router corresponding to the same node. The data router can then begin to transfer the message along the path determined by the control plane, using the path information. FIG. 8B shows a case in which the paths of the messages of B and C have been set, but the message of A is still blocking the paths. The messages of B and C can be transferred to the nodes (1,1) and (2,1) until the path of A is released. Then, since the paths of B and C are already set, the messages can be transferred as soon as A releases the path, without a delay to set the paths of B and C, as shown in FIG. 8C.

FIG. 9 shows an embodiment in which the number of data planes is extended by two in order to triple the bandwidth. It is noted that the bandwidth of the interconnection network is theoretically extendable. According to the present invention, it is possible to arbitrarily extend the bandwidth of only the data plane, since the control plane and the data plane are separated in the interconnection network, and to construct a high speed interconnection network, since the latency time consumed when the path is set is independent of the size and frequency of the data which is transferred across the interconnection network. Therefore, it is possible to construct a flexible multicomputer system, taking advantage of the large bandwidth and short latency time.

What is claimed is:

1. An interconnection network for a multiprocessor communication system, said interconnection network comprising a plurality of nodes arranged in a predetermined topographical structure, each of said nodes comprising:

a single interface connected to a corresponding single processor for receiving source message data from said processor and transmitting destination message data to said processor;

a control router connected to receive control data from said interface;

a first data router connected to receive and transmit message data over a first data connection with said interface;

a second data router connected to receive and transmit message data over a second data connection with said interface;

a control line connected to each of said control routers of each of said nodes for transferring said control data from a control router of a source node to a control router of a destination node, said control line and said control routers forming a control plane arranged in said predetermined topographical structure;

a first data line connected to each of said first data routers of each of said nodes for transferring message data from a first data router of said source node to a first data router of said destination node, said first data line and said first data routers forming a first data plane arranged in said predetermined topographical structure; and a second data line connected to each of said second data routers of each of said nodes for transferring message data from a second data router of said source node to a second data router of said destination node, said second data line and said second data routers forming a second data plane arranged in said predetermined topographical structure, wherein said first and second data lines carry only message data and said control line carries only control data.

2. The interconnection network for a multiprocessor communication system as set forth in claim 1, wherein each said interface of each of said nodes comprises further data connections for connecting to further data routers of said node to extend a bandwidth of said interconnection network.

3. The interconnection network for a multiprocessor communication system as set forth in claim 1, wherein predetermined topographical structure is ring, a Banyan, a tree, a hypercube, a mesh or a torus interconnection network.

4. The interconnection network for a multiprocessor communication system as set forth in claim 1, wherein said control data comprises header information including an address of said destination node, and said control router of said source node utilizes said address to set a message data communication path through intermediate nodes to said destination node over one of said first and second data planes and to set a control data communication path through said intermediate nodes to said destination node over said control plane.

5. The interconnection network for a multiprocessor communication system as set forth in claim 4, wherein each of said control routers of said intermediate nodes in said communication path determine whether a data router in said message data communication path is free to transmit message data, such that the control router, which determines that a corresponding data router is not free, blocks the transmission of said message data until it is determined that said data router is free, said message data communication path remaining set until said message data is transmitted through said data router.

6. A method of transferring data in an interconnection network comprising a plurality of nodes arranged in a predetermined topographical structure, each of said nodes comprising a single processor for transmitting and receiving control data and message data, a control router disposed in a control plane, one or more data routers, and one or more data planes in each of which one of the data routers is disposed, respectively, said method comprising the steps of:

detecting header information in control data transmitted from a source processor in a source node and determining destination processor a destination node in response to address data in said header information;

setting a control data communication path through intermediate nodes to said destination node over said control plane and setting a separate message data communication path through said same intermediate nodes to said destination node over one of said data planes;

transferring only said control data from the control router of said source node to each control router in said control data communication path;

determining, by each of said control routers in said control data communication path, whether a corresponding data router in said message data communication path is free to transmit message data through the correspond node; wherein said message data communication path transmits only message data;

blocking the message data communication path to prevent transmission of said message data, when it is determined that one of said data routers is not free, while maintaining said control data communication path;

releasing the message data communication path, when it is determined that said one of said data routers is free, to transmit said message data to the processor of the destination node.

7. A method of transferring data in an interconnection network comprising a plurality of nodes arranged in a predetermined topographical structure, each of said nodes comprising a single processor for transmitting and receiving control data and message data, a control router disposed in a control plane, a first data router disposed in a first data plane and a second data router disposed in a second data plane, said method comprising the steps of:

detecting header information in control data transmitted from a source processor in a source node and determining destination processor a destination node in response to address data in said header information;

setting a control data communication path through intermediate nodes to said destination node over said control plane and setting a separate message data communication path through said same intermediate nodes to said destination node over one of said first and second data planes;

transferring only said control data from the control router of said source node to each control router in said control data communication path;

determining, by each of said control routers in said control data communication path, whether a corresponding data router in said message data communication path is free to transmit message data through the correspond node; wherein said message data communication path transmits only message data;

blocking the message data communication path to prevent transmission of said message data, when it is determined that one of said data routers is not free, while maintaining said control data communication path;

releasing the message data communication path, when it is determined that said one of said data routers is free, to transmit said message data to the processor of the destination node.

* * * * *